United States Patent

[11] 3,629,093

| [72] | Inventor | David W. Sickels<br>Plymouth, Mich. |
|---|---|---|
| [21] | Appl. No. | 865,696 |
| [22] | Filed | Oct. 13, 1969 |
| [45] | Patented | Dec. 21, 1971 |
| [73] | Assignee | Electrogenics, Inc.<br>Wayne County, Mich. |

[54] PISTON DEBURRING APPARATUS
6 Claims, 3 Drawing Figs.

[52] U.S. Cl. .................................................. 204/224, 204/143 M, 204/289
[51] Int. Cl. ...................................................... B23p 1/02, B01k 3/04
[50] Field of Search .......................................... 204/224, 225, 143 M, 289

[56] References Cited
UNITED STATES PATENTS

| 3,410,781 | 11/1968 | Carlson et al. | 204/224 |
| 3,458,424 | 7/1969 | Bender | 204/224 |
| 3,467,593 | 9/1969 | Dickson et al. | 204/224 |
| 3,475,303 | 10/1969 | Sadler et al. | 204/224 X |
| 3,533,926 | 10/1970 | Zubak et al. | 204/224 X |

Primary Examiner—John H. Mack
Assistant Examiner—D. R. Valentine
Attorney—Cullen, Settle, Sloman & Cantor

ABSTRACT: Electrochemical machining apparatus for deburring cylindrical workpieces incorporating a two-part workpiece holder with one part retractable to permit loading and unloading. The electrode fits within the workpiece and delivers both electrolyte and machining current to the areas to be deburred. Also a movable contact for the machining circuit is actuated by the workpiece holder to facilitate loading and unloading.

INVENTOR.
DAVID W. SICKELS.

BY CULLEN, SETTLE,
SLOMAN & CANTOR.
ATT'YS.

INVENTOR.
DAVID W. SICKELS.
BY CULLEN, SETTLE, SLOMAN & CANTOR.
ATT'YS.

PISTON DEBURRING APPARATUS

DISCLOSURE

The mechanical deburring of some parts, for example, an internal combustion engine piston with both wrist pin bores and oil holes that open into annular grooves, is time consuming and often the complete burr is not removed when utilizing the usual mass-production techniques. If the oil holes are other than round, special tools must be provided and these tools must not themselves create another burr. Also, the wrist pin bores are required to be dimentionally precise, hence any interference with this size and its finish can render the piston unacceptable and may even require it to be scrapped.

If instead of being done mechanically, the deburring is to be done by the well-known electrochemical machining process, not only is there the problem of not altering the size or finish of either the wrist pin bores or the oil ring grooves but the exterior of the piston must not be altered either sizewise or finishwise. Then, too there is the problem of delivering both the electrolyte and the machining current to the areas to be deburred. Regardless of how effective the process may be, it must be capable of conforming to mass-production requirements.

Accordingly, electrochemical machining apparatus is contemplated for rapidly and efficiently deburring workpieces without interferring with the size or finish of the workpiece.

Also, contemplated is electrochemical machining apparatus which facilitates rapid loading and unloading of the workpieces so that the deburring can be carried out.

Further contemplated is electrochemical machining apparatus that clamps workpieces in such a way as to protect already machined surfaces or surfaces which are not to be machined and also in a unique way incorporates the workpiece into the machining circuit.

More specifically contemplated is electrochemical machining apparatus incorporating a unique electrode structure that delivers both current and electrolyte to the areas to be deburred without concern for secondary machining effect.

Also, an objective is electrochemical machining apparatus having novel provision for not only retaining and locating the workpieces but also unique provision for distributing the electrolyte to the surfaces to be deburred.

The foregoing and other objects and advantages of the invention will become apparent from the following description and from the accompanying drawings, in which.

Figure 1:
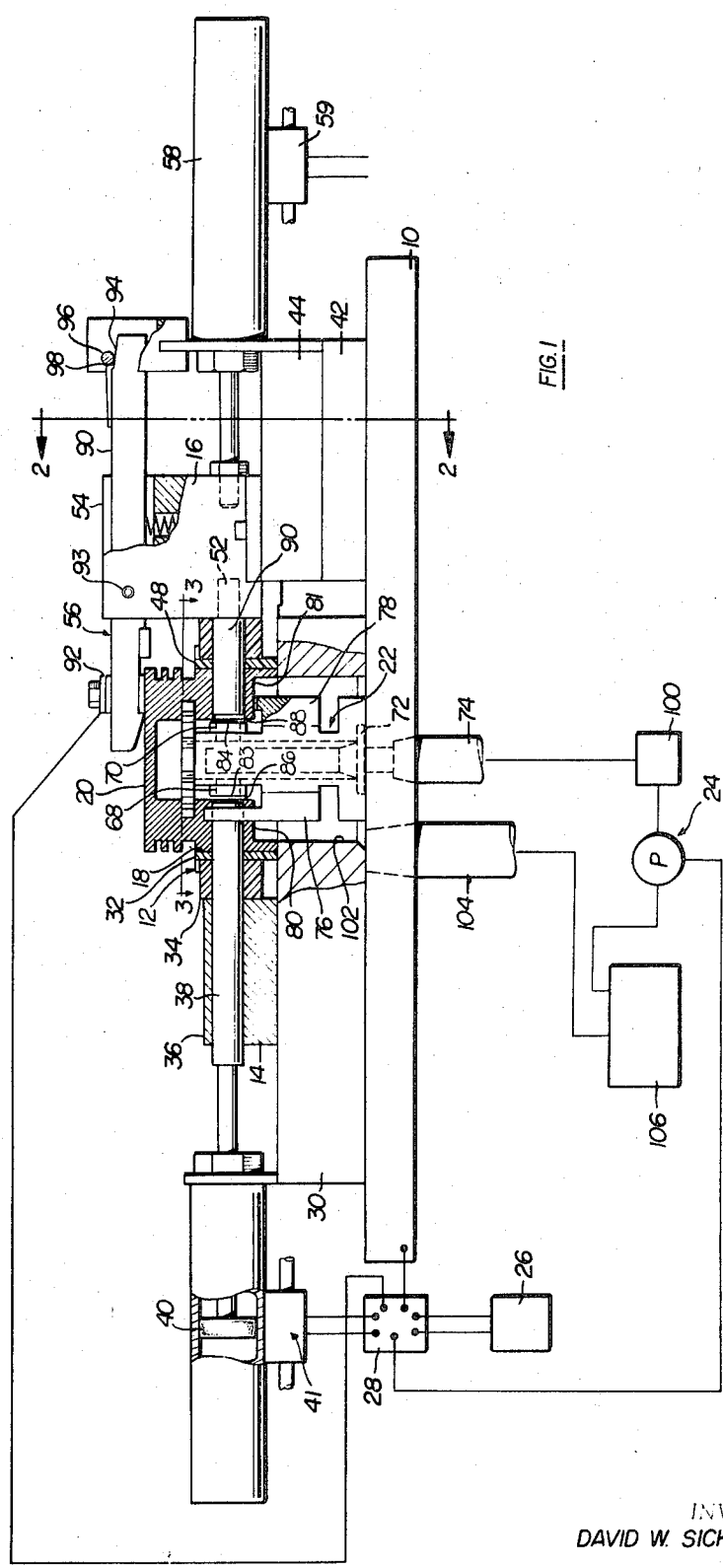
FIG. 1 is a sectional view, partially schematic, showing electrochemical machining apparatus incorporating the principles of the invention.

Referring to the drawings in detail and initially to electrochemical machining apparatus in FIG. 1, the numeral 10 denotes generally a support made of a noncorrosive and conductive material such as stainless steel. Positioned, the support 10 is a workpiece holder 12. The workpiece holder 12 is formed in two parts and includes a stationary part 14 and a movable part 16 which together define a workspace 18 for workpiece 20, such as the illustrated internal combustion engine piston. The workpiece 20 surrounds an electrode designated generally by the numeral 22. The electrode 22 communicates with a source of electrolyte under pressure shown generally at 24 as a pump and also is connected in circuit with a power source 26 which provides a low voltage current when an appropriate control 28 is operated in a way to be explained to control the various functions of the apparatus.

Figure 3:
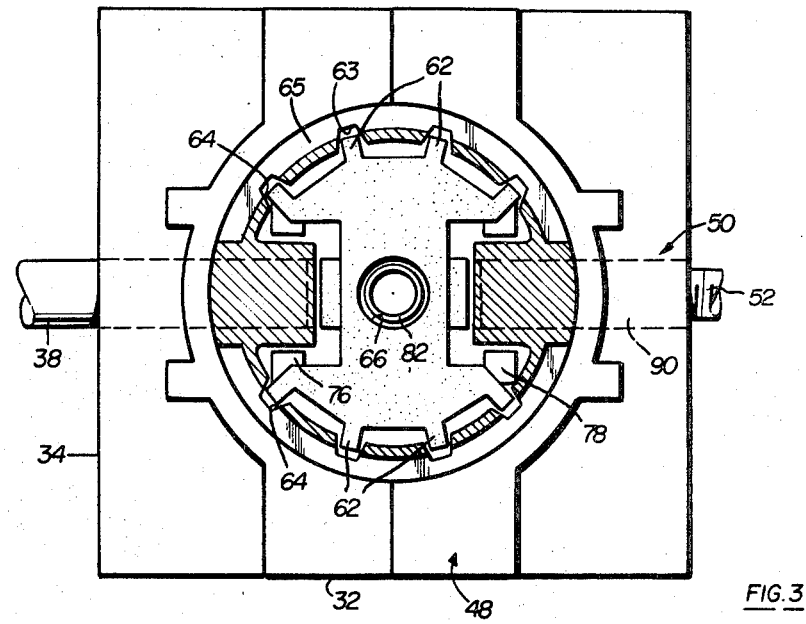
FIG. 3 is a sectional view of the apparatus taken along line 3—3 of FIG. 1.

Considering first, the workpiece holder 12 and its stationary part 14, as viewed in FIG. 1, the stationary part 14 includes a block 30 of a material that is noncorrosive and nonconductive such as any appropriate plasticlike material, e.g., that known as Delrin. This block 30 surrounds the workspace 18 and provides a nonconductive seat for the workpiece 20. On this block 30 is a semicircular segment 32 formed of a resilient material that will conform to the periphery of the workpiece 20 as illustrated in FIGS. 1 and 3 to effect a seal therewith. This segment 32 may be made of polyurethane and is attached to a backing member 34 which may also be made of Delrin and is appropriately secured to the block 30. Releasably attached to the backing member 34 and also secured to the block 30 is a guide 36. The segment 32, the backing member 34 and the guide 36 each have aligned bores therein for reception of a slidable rod 38. The rod 38 serves as an electrolyte deflector or distributor as will be explained. The slidable rod 38 is maneuvered by a suitable motor 40, which may be of the piston type and actuated by fluid under pressure from any appropriate source (not shown). This actuation can be by the control 28 through the agency of a force motor 41 or the like.

Figure 2:
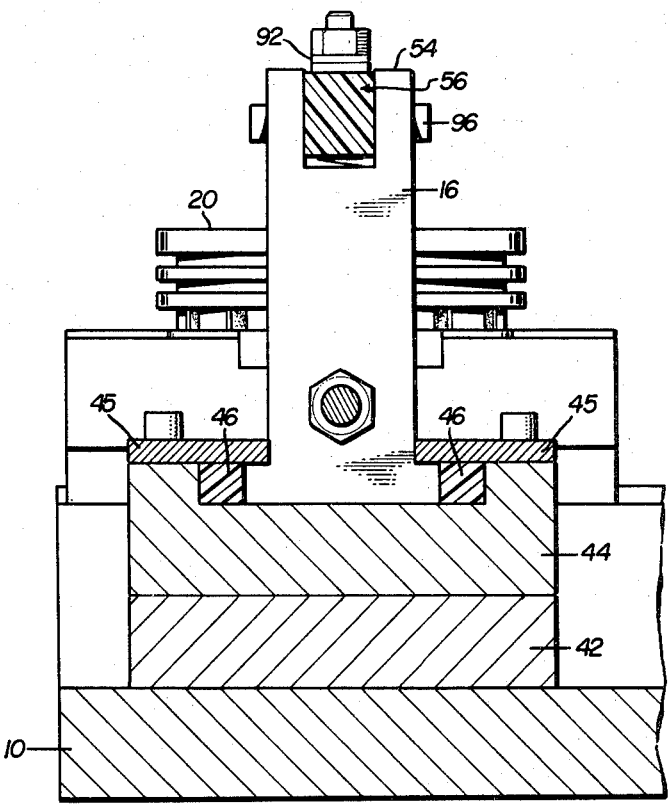
FIG. 2 is a side elevational view of the FIG. 1 apparatus.

The movable workpiece holder part 16 includes an insulator block 42 of any suitable type of electrically inert and noncorrosive material such as the aforementioned Delrin. A guide block 44 formed of stainless steel is along with the insulator block 42 attached to the support 10. The guide block 44 provides slide ways, as shown by the numeral 45 in FIG. 2, for a slide 46. The slide 46 is made of a plasticlike material and has positioned thereon a semicircular segment 48 and a backing member 50. The segment 48 and the backing member 50 are similar to the segment 32 and the backing member 34 and are made of the same materials. The slide 46 has a rod 52 attached thereto. The segment 48 and the backing member 50 have aligned bores for receiving the rod 52 which serves the same electrolyte deflecting function as the rod 38 in the stationary workpiece holder part 14. Also connected to the slide 46 is a bifurcated member 54 which pivotably mounts a movable contact assembly 56. The slide 46 is moved back and forth within the guide block 44 by an appropriate motor shown generally at 58. This motor 58 may be of the fluid pressure actuated piston type and have its piston rod secured to the slide 46. As with the motor 40, actuation can be by the control 28 through a force motor 59.

The electrode 22 is attached to the support 10 and in electric contact therewith. On the upper end the electrode 22 has a plurality of fingers 62 each of which is positioned in downwardly opening grooves 63. Each groove 63 opens into an oil hole 64, which in turn opens into an annular ring groove 65 in the workpiece 20. The electrode 22 has a center electrolyte passage 66 which communicates with lateral passages 68 and 70. An O-ring-type seal 72 effects a seal between the center passage 66 and the support 10 to which is delivered the electrolyte by way of a supply passage 74. The electrode 22 also includes two locater members 76 and 78 of electrically inert material. These locater members 76 and 78 as observed in FIGS. 1 and 2 partially surround the workpiece wrist pin bosses denoted by the numerals 80 and 81. The electrode 22 is formed of a conductive material, such as brass, and has a sleeve 82 of plastic or the like within the electrolyte passage 66 to insulate it from the electrolyte. The exterior of the electrode 22 is masked also with a plasticlike material for the fingers 62 and boss faces 83 and 84, which respectively surround lateral passages 68 and 70 and are positioned opposite the wrist pin boses 80 and 81.

When the electrolyte flows through the lateral passage 68 and 70 the rods 38 and 52 respectively in the stationary and movable workpiece holder parts 14 and 16 will be in the illustrated position so that the electrolyte is deflected and kept from the interior of the wrist pin bores. The electrolyte is deflected into contact with the edges shown generally at 86 and 88 so as to cause the bore edge to be deburred. Subsequently and as will become apparent when the workpiece 20 is to be removed, these rods 38 and 52 are retracted from the wrist pin bores respectively by the motors 40 and 58.

The contact assembly 56 includes a contact arm 90 which at one end has a contact 92 that engages the top of the workpiece 20 and is connected to the control 28. The contact arm 90 is pivoted on the bifurcated member 54 at 93 and at the opposite end has a cam surface 94 that engages a cam roller 96 which is fixed in any suitable way to the support 10. Thus, when the motor 58 is actuated to retract the movable workpiece holder part 16, the cam surface 94 will have its high point at 98 moved against the cam roller 96 and this will cause the contact arm 92 to pivot so that the contact 92 will be rotated outwardly, i.e., clockwise about the pivot point 93 as viewed in FIG. 1. When the motor 58 is operated to move the part 16 back to the illustrated position, the contact arm 90 will be rotated back to the depicted position and into engagement with the top of the workpiece 20 so as to complete the machining circuit.

Operationally, assuming that the slide 46 is retracted and that the workpiece 20 has been positioned in the workspace 18, then the control 28 is operated so as to extend both of the motors 40 and 58. This causes the rod 38 to be moved to the illustrated position in the wrist pin bore in the boss 80. Also, the slide 46 is moved to the illustrated position with the rod 52 engaging the opposite bore in the way mentioned. The contact arm 90, by the action of the cam surface 94 and the cam roller 96 is pivoted so that the contact 92 engages the top of the workpiece 20. The control 28 can now be operated to supply electric current from the power source 26 to the support 10 and then to the electrode fingers 62 and the electrode faces 82 and 84. This same control 28 can be used to start so as to deliver to the supply passage 74 the electrolyte at a pressure established by an appropriate pressure regulator valve 100. This pressurized electrolyte flows through the openings 68 and 70 and outwardly against the ends of the rods 38 and 52 which deflects it along the edges 86 and 88 of the wrist pin bores and away from these bores so that they are not affected. Since the workpiece 20 is positioned on the nonconductive block 30 and grasped by the nonconductive segments 18 and 48. The workpiece 20 is connected in circuit with the power source 26 only by way of the electrolyte and the contact 92. The machining circuit is thus from the power source 26 through the control 28, the support 10 and the electrode 22 to the faces 82 and 84 and then by way of the electrolyte across the gap to the boss edges 86 and 88 of the workpiece 20 and back to the source 26. The deburring of the edges 86 and 88 occurs and the contaminated electrolyte then proceeds downwardly through to a chamber 102 and by way of a drain passage 104 back to a sump 106. Also, the electrolyte exit at the top of the electrode and then flows around the fingers 62 and out the holes 64. By way of the same machining circuit the current flows through the electrolyte in the resultant gap between these exposed fingers 62 and the edges of the holes 64 and the deburring of these holes also occurs. After this, the electrolyte exits to the exterior of the workpiece 20 and then can be trapped by an appropriate trough (not shown) and returned to the sump 106. At the termination of the alloted deburring time which may be by way of example, two to three seconds, the control 28 is effective to cut off current flow as well as electrolyte flow is desired and then to retract both of the motors 40 and 58 so that the rod 38 is withdrawn from its wrist pin bore and the slide 46 is moved to the retracted position, removing the rod 52 from its wrist pin bore. Also the action of the cam surface 94 relative to the cam roller 96 will move the contact 92 upwardly and now the movable workpiece holder part 16 and its segment 48 will be retracted away from the periphery of the workpiece 20 so that the workpiece 20 can be hand or otherwise removed from the workspace 18. Another workpiece 20 is inserted and the cycle is recommenced.

Although the workpiece 20 is shown as a piston it may be of many different forms as those versed in the art will appreciate.

What is claimed is:

1. An apparatus for electrochemical machining an area of a conductive workpiece comprising a source of electrolyte under pressure, a source of electric power, a support, a workpiece holder positioned on the support and having a stationary holder part and a movable holder part, the movable holder part being reciprocal on the support between a clamping position in which the workpiece is held against the stationary holder part and a retracted position to which the workpiece is unclamped, the stationary and movable holder parts each having a resilient nonconductive portion for embracing a portion of the workpiece and in sealing relation therewith so as to prevent machining of the embraced portion, motor means for reciprocating the movable holder part between the clamping and retracted positions, an electrode positioned within the workpiece and having an opening therein communicating with the source of electrolyte and arranged to supply the electrolyte to the areas on the workpiece to be machined, and circuit means for connecting the workpiece and the electrode to the source of electric power.

2. The apparatus as described in claim 1, wherein the circuit means includes a movable contact engageable with the workpiece and cam means actuatably by the motor means to move the contact out of engagement with the workpiece when the movable holder part is moved to the retracted position.

3. The apparatus as described in claim 1 wherein the electrode has a series of fingers, each positionable proximate to areas on the workpiece to be machined and arranged so that the electrolyte flows thereby to cause the machining when the circuit means is operative.

4. The apparatus as described in claim 1, wherein the movable holder part includes a deflector for facilitating the distribution of the electrolyte to the area on the workpiece to be machined.

5. The apparatus as described in claim 1, wherein the workpiece has a bore edge to be machined and the apparatus further includes a movable deflector positionable within the bore so as to deflect the electrolyte from the interior thereof and to the bore edges, means for maneuvering the deflector to and from the deflecting position.

6. An apparatus for electrochemically deburring an annular workpiece having a plurality of holes to be deburred, the combination comprising a source of electrolyte under pressure, a source of electric power, a support, a workpiece holder positioned on the support to define a workspace for the workpiece, the workpiece holder including a stationary holder part and a movable holder part positioned on the support so as to be movable between a clamping position for holding the workpiece in engagement with the stationary holder part and a retracted position in which the workpiece is unclamped, the stationary holder part and the movable holder part each having resilient portions for sealing engaging the exterior of the annular workpiece so as to effect a seal therebetween, motor means for maneuvering the movable part between the clamping position and the retracted position, an electrode positioned within the workspace so as to extend within the annular workpiece and having multiple fingers extending so as to be proximate certain ones of the holes to be deburred, the electrode having a center opening and lateral openings communicating with the source of electrolyte, electrolyte deflectors adjacent to the lateral openings for directing the electrolyte to other of the holes to be deburred, one of the deflector element being movable with the movable holder part and the other deflector element being movable relative to the stationary holder part, a motor for moving the other deflector element relative to the stationary holder part, and circuit means for connecting the workpiece and the electrode to the source of electric power, the circuit means including a movable contact engageable with the workpiece and cam means actuatable by the motor means to move the contact out of engagement with the workpiece when the movable holder part is moved to the retracted position.

* * * * *